United States Patent [19]

Etherington et al.

[11] Patent Number: 5,253,727
[45] Date of Patent: Oct. 19, 1993

[54] STEERING MECHANISM FOR AN ARTICULATED VEHICLE

[75] Inventors: Michael Etherington, Abingdon, Va.; Michael R. Long, Gainsborough, England

[73] Assignee: Dosco Overseas Engineering Ltd., Notts, United Kingdom

[21] Appl. No.: 906,896

[22] Filed: Jun. 30, 1992

[30] Foreign Application Priority Data

Jan. 14, 1992 [GB] United Kingdom ............ 9200657

[51] Int. Cl.⁵ .................................... B62D 13/00
[52] U.S. Cl. ................................. 180/137; 180/134; 280/426
[58] Field of Search ................ 180/137, 134, 136; 280/426, 458

[56] References Cited

U.S. PATENT DOCUMENTS

| | | | |
|---|---|---|---|
| 2,362,262 | 11/1944 | French | 180/137 |
| 2,593,643 | 5/1952 | Woolf | 200/153 |
| 2,676,664 | 4/1954 | Richter | 180/137 X |
| 2,765,862 | 10/1956 | Tucker, Jr. | 180/51 |
| 3,168,332 | 2/1965 | Eynon | 280/426 |
| 3,326,316 | 6/1972 | Thassy | 180/137 |
| 3,426,863 | 2/1969 | Hanson | 180/79.2 |
| 3,699,676 | 10/1972 | Beck | 60/52 S |
| 4,160,619 | 7/1979 | Nelson | 414/501 |
| 4,324,305 | 4/1982 | Soyland | 180/134 |

FOREIGN PATENT DOCUMENTS 0253964 4/1988 European Pat. Off. .
3345277 6/1985 Fed. Rep. of Germany .

OTHER PUBLICATIONS

Joy Manufacturing Drawing No. JCM729-4, May 25, 1974 "Conveyor Assembly".

Primary Examiner—Margaret A. Focarino
Assistant Examiner—C. Mattix
Attorney, Agent, or Firm—Webb, Burden, Ziesenheim & Webb

[57] ABSTRACT

A steering mechanism for an articulated vehicle having a first section and a second section connected by an articulation joint. The steering mechanism includes an annular member connected to the first section and a moveable steering plate slideably mounted on the second section. The annular plate and the steering plate are connected by chains and a pair of opposed piston and cylinder devices are mounted on the second section and connected to the steering plate to move the steering plate and the chains to adjust the position of the annular plate to rotate the first section of the vehicle relative to the second section of the vehicle about the articulation joint between the sections.

16 Claims, 2 Drawing Sheets

STEERING MECHANISM FOR AN ARTICULATED VEHICLE

BACKGROUND OF THE INVENTION

1. Field of the Invention

The present invention relates generally to a mechanism for steering an articulated vehicle and more particularly to a mechanism for steering a vehicle with a plurality of pivotally connected sections without steering the vehicle wheels.

Many articulated vehicles such as earthmovers and tractors, carry large loads which require the transmittal of large amounts of power to all of the vehicle wheels. The vehicles may be equipped with shovels or other tools, such that steering the vehicle wheels is impractical. These vehicles may be steered by exerting forces between adjacent sections of the vehicle to swing one section relative to another section about an articulation joint.

This may be accomplished by piston and cylinder steering arrangements which are usually hydraulic and which act on each side of the vehicle to swing the vehicle sections relative to each other. Piston and cylinder steering arrangements are usually connected between vehicle sections so that the extension of the device on one side of the vehicle causes the vehicle to bend toward the opposite side. Likewise, compression of the piston and cylinder steering arrangement on one side of the vehicle causes the vehicle to bend toward the same side. Extension and compression of the piston and cylinder arrangements on opposite sides of a vehicle can be coordinated to turn the vehicle.

A steering mechanism as described above has a number of disadvantages. The piston and cylinder arrangements are located on the exterior of the vehicle and are therefore exposed to damage by contact with other equipment and with stationary objects. The angle between each piston and cylinder arrangement and its mountings on the vehicle constantly change as the vehicle is steered which alters the steering torque. Additionally, if it is decided to use an articulation joint having a large diameter, for reasons of rigidity or otherwise, it may be impossible to mount piston and cylinder steering arrangements on a vehicle without substantially increasing the dimensions of the vehicle, which is often disadvantageous.

SUMMARY OF THE INVENTION

There is a need for a relatively compact steering mechanism for use on articulated vehicles, which system retains the advantages of a piston and cylinder arrangement. The present invention provides such a compact steering mechanism.

One modification of the invention is a steering mechanism for an articulated vehicle having a first section and a second section connected by an articulation joint. The steering mechanism includes a pair of chains or elongated cables having one end connected to the first section and the other end connected to a member which is moveably mounted on the second section, and means to move the member on the second section to pull one of the chains or cables to swing the first section relative to the second section about the articulation joint. The moveable member functions as a steering plate.

Preferably, the moveable member is mounted on the second section of the vehicle such that it slides in a horizontal plane which is perpendicular to the longitudinal axis of the vehicle. The member is moved by two opposed hydraulic piston and cylinder arrangements mounted on the second section of the vehicle. The chains or cables extend around a portion of a vertical arcuate face of a member which is attached to the first section of the vehicle. The center of curvature of the arc corresponds with the axis of articulation of the vehicle sections.

The moveable member may be a vertical plate having the chains or cables attached thereto, one above the other, and the two chains or cables are entrained around the arcuate face of the member attached to the first section of the vehicle, one above the other. One end of one chain or cable is fixed to one side of the arcuate edge of the arcuate member and one end of the other chain or cable is fixed to the opposite side of the arcuate member. The chains are wrapped around the face of the arcuate member and are held in position by outwardly extending protrusions on the face and intersect in a central region thereof, one above the other. The end portion of each chain or cable which is not wrapped around the face of the arcuate member on the first vehicle section is engaged with the moveable member and the opposite end of each chain or cable is fixed to that end of the moveable member located on the opposite side of the articulation joint from the fixed point of the first end. When the moveable member is moved in one direction, there is tension on one of the chains or cables, and when the member is moved in the opposite direction there is tension on the other chain or cable. This causes one vehicle section to swing relative to the other vehicle section. Since at any one time a length of chain or cable is in contact with the moveable member, a considerable force can be transmitted by the chain or cable. Likewise, because the chain or cable is wrapped around the arcuate face, the torque transmitted by the chain or cable to the arcuate face is transmitted over a much larger area than would otherwise be possible. In addition, if the end of the chain or cable is fixed to an extension of the arcuate face in an area where the effective radius from the articulation axis is larger than the radius of the arcuate face, e.g. where the face is most proximal to the moveable member, the mechanical advantage available to rotate one section relative to the other is increased.

It will be understood by those skilled in the art that the operation of the above-described steering mechanism is similar in principle to a toothed rack and pinion drive although no teeth are used in the steering mechanism of the invention.

A complete understanding of the invention will be obtained from the following description when taken in connection with the accompanying drawings wherein like reference characters identify like parts throughout.

DESCRIPTION OF THE PREFERRED EMBODIMENTS

Figure 1:
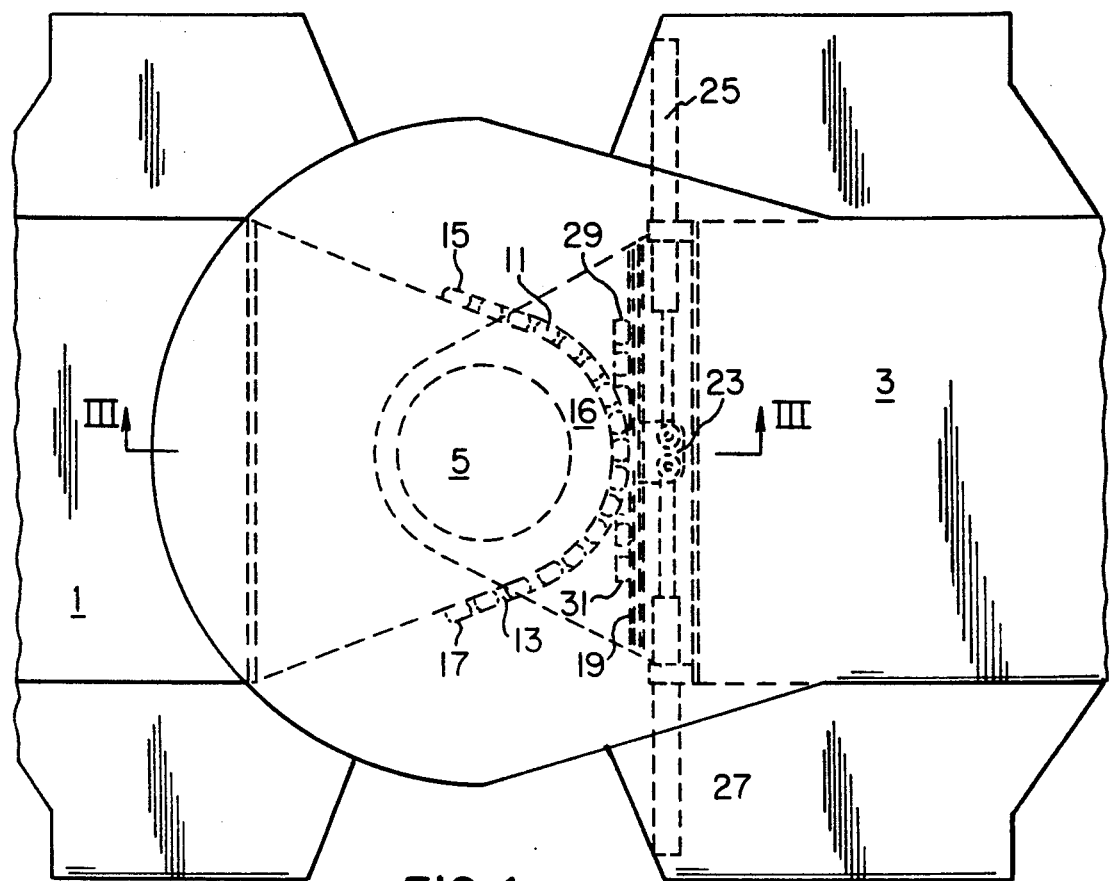
FIG. 1 is a schematic plan view of an articulation joint including the steering mechanism of the invention.
Figure 4:
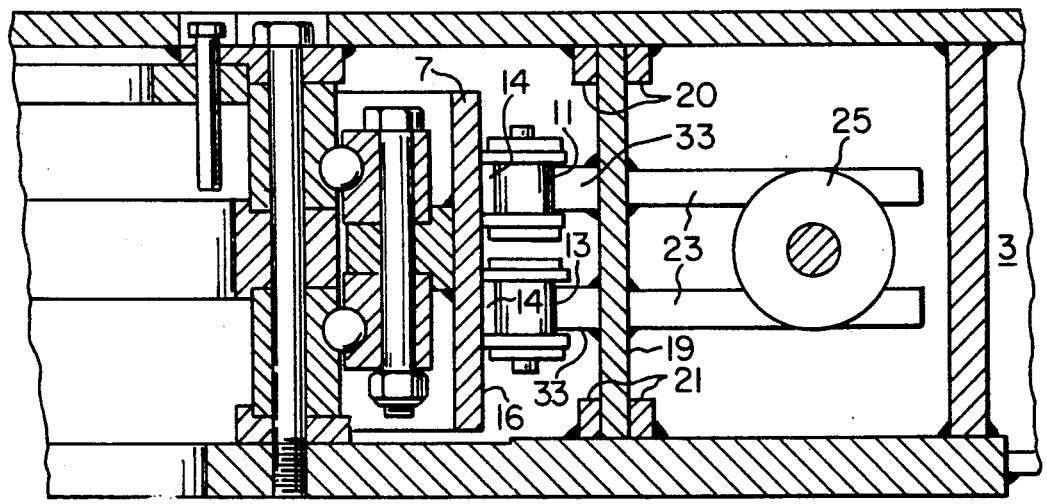
FIG. 4 is an enlarged view of a part of FIG. 3.
Figure 2:
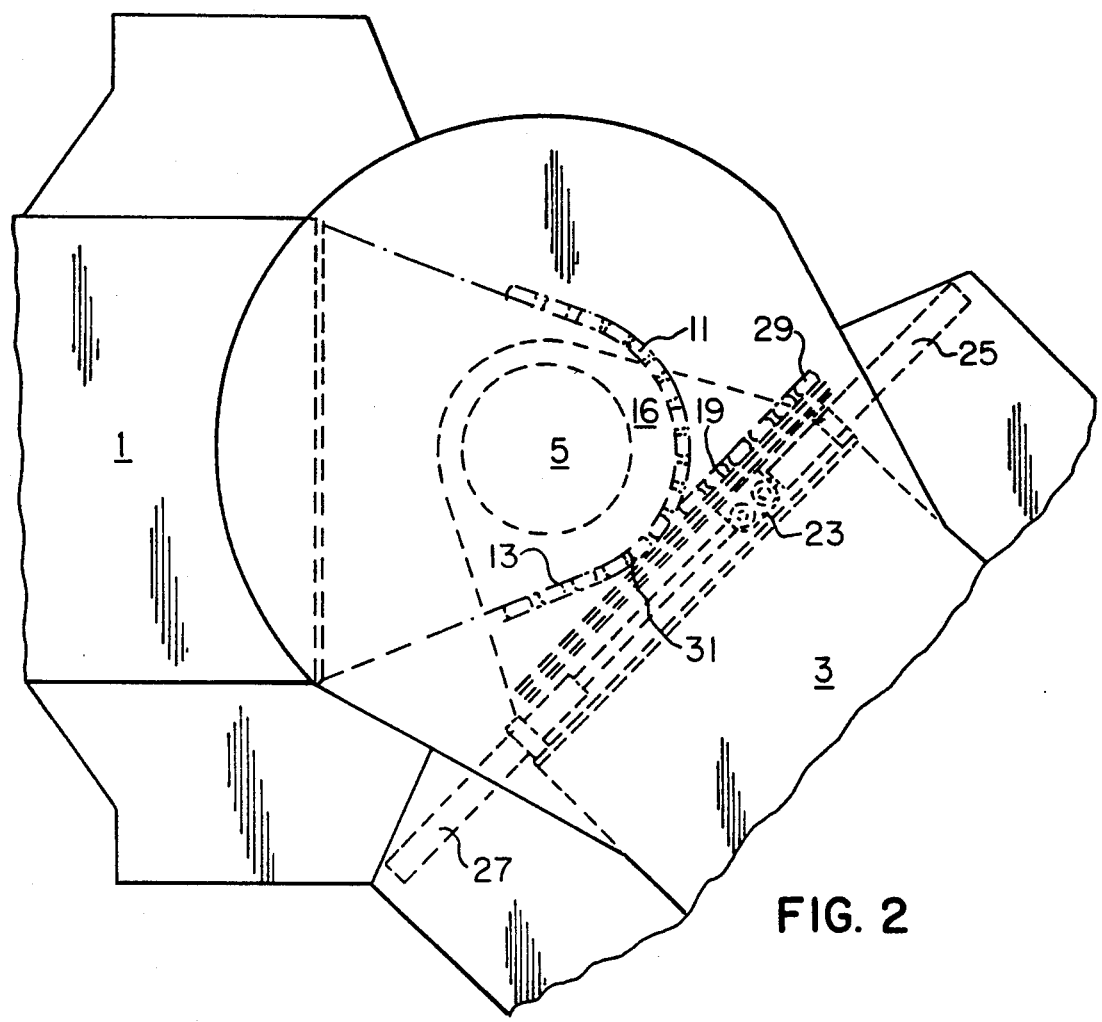
FIG. 2 is a view similar to FIG. 1, with steering applied to the vehicle sections.
Figure 3:
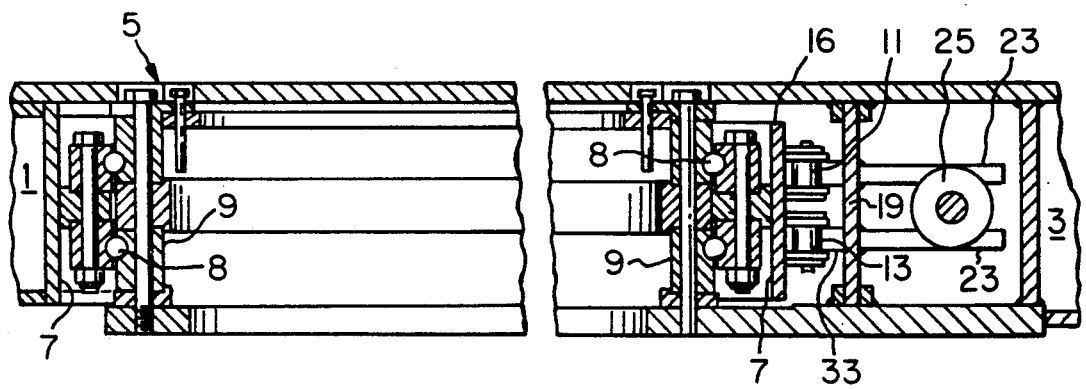
FIG. 3 is a broken section on the line III—III of FIG. 1.

As shown in FIGS. 1 and 2 of the drawings the invention may be used in an articulated vehicle having a first section 1 and a second section 3 which are connected by an articulation joint 5. The specific details of the articulation joint are the subject of our co-pending U.S. patent application Ser. No. 07/906,577 filed contemporaneously herewith. Articulation joint 5 includes an outer vertical annular member 7 which is rigidly attached to section 1 of the vehicle. A substantially horizontal annular tongue is attached to the inner surface of annular member 7 and outer members of slewing rings are mounted on the tongue. Inner members 9 of slewing rings are rotatable relative to annular member 7 and the outer members of the rings on ball bearings 8.

A first roller chain 11 and a second roller chain 13 are located on guide protrusions 14 formed on the outer surface of an arcuate portion 16 of annular member 7. The chains have their first ends 15 and 17 fixed to opposed points on the first section of the vehicle. While chains are described and shown herein, it will be understood by those skilled in the art that other elongated flexible members such as multi-strand cable and rope can also be used. A moveable steering plate 19 is slideably mounted between upper and lower plates forming parts of vehicle section 3 and is located in channels formed by spaced strips 20 and 21 welded to the facing sides of the upper and lower plates. Steering plate 19 is operatively connected by spaced plates 23 which are welded thereto to the piston rods of two piston and cylinder devices 25 and 27 which are attached to section 3. Second ends 29 and 31 of chains 11 and 13 are fixed to steering plate 19. The steering plate includes lugs 33 to engage the chains and maintain them in place.

As shown in FIG. 2 of the drawings, steering is achieved by moving steering plate 19 relative to vehicle section 3 by extending the rod of piston and cylinder arrangement 27 and contracting the rod of piston and cylinder arrangement 25 from the positions shown in FIG. 1 of the drawings to the positions shown in FIG. 2 of the drawings. This movement of steering plate 19 causes chain 13 to be pulled by the steering plate to pivot vehicle section 1 relative to vehicle section 3 into the position shown in FIG. 2 of the drawings. This movement of the steering plate also causes chain 11 to substantially wrap around arcuate surface 16 of annular member 7 on vehicle section 1 with only a short section of chain 11 remaining in contact with steering plate 19 in the proximity of the end 31 of the chain. When the vehicle sections are to be straightened, steering plate 19 is moved in the opposite direction by the extension of the rod of piston and cylinder arrangement 25 and the simultaneous contraction of the rod of piston and cylinder arrangement 27. This movement of steering plate 19 causes chain 11 to be pulled to straighten the vehicle sections.

While the steering mechanism described above can be used to steer different types of articulated vehicles, it has been specifically designed for steering an articulated mine shuttlecar, such as that described in our co-pending U.S. patent application Ser. No. 07/906,569 filed contemporaneously herewith.

While a specific embodiment of the invention has been described in detail herein, it will be appreciated by those skilled in the art that various modifications and alternatives to the embodiment could be developed in light of the overall teachings of the disclosure. Accordingly, the particular arrangement is illustrative only and is not limiting as to the scope of the invention which is to be given the full breadth of the appended claims and any and all equivalents thereof.

We claim:

1. A steering mechanism for an articulated vehicle having a first section and a second section interconnected by an articulation joint, said steering mechanism comprising means having a substantially arcuate surface on said first section, moveable means mounted on said second section, means connecting said means having a substantially arcuate surface and said moveable means to move said means having a substantially arcuate surface, and means to move said moveable means relative to said second section to adjust said means connecting said means having a substantially arcuate surface and said moveable means to rotate said first section of a vehicle relative to said second section of a vehicle about said articulation joint.

2. A steering mechanism as set forth in claim 1 wherein said moveable means is a steering plate slideably mounted on said second section of a vehicle to reciprocate in a horizontal plane which is perpendicular to the longitudinal axis of said vehicle to adjust said means connecting said means having a substantially arcuate surface and said moveable means to rotate said first section of a vehicle relative to said second section of a vehicle.

3. A steering mechanism as set forth in claim 1 wherein said means to move said moveable means relative to said second section is opposed hydraulic piston and cylinder arrangements each of said hydraulic piston and cylinder arrangements having a first end mounted on said second section and a second end connected to said moveable means.

4. A steering mechanism as set forth in claim 1 wherein said first section of a vehicle has an annular member fixed thereto and said means having a substantially arcuate surface is a portion of the outer face of said annular member, the center of curvature of said outer face of said annular member corresponds with the axis of articulation of said sections of a vehicle.

5. A steering mechanism as set forth in claim 3 wherein said moveable means is a steering plate, and said means connecting said means having a substantially arcuate surface and said moveable means are first and second vertically spaced chains entrained around said means having a substantially arcuate surface of said first section, one end of said first chain being fixed to one side of said means having a substantially arcuate surface and the other end of said first chain being fixed to said steering plate and one end of said second chain being fixed to the opposite side of said means having a substantially arcuate surface and the other end of said second chain being fixed to said steering plate, said chains intersecting one above the other in a central region of said steering plate.

6. A steering mechanism as set forth in claim 5 wherein a portion of each of said chains is in engagement with said means having a substantially arcuate surface on said first section and a portion of each of said chains is in engagement with a part of said steering plate.

7. A steering mechanism for an articulated vehicle having a first section and a second section interconnected by an articulation joint, said steering mechanism comprising arcuate means on said first section, a steering plate slideably mounted on said second section to reciprocate in a horizontal plane perpendicular to the longitudinal axis of said second section, means connecting said arcuate means and said steering plate to rotate said arcuate means, and means to move said steering plate relative to said second section to adjust said means connecting said arcuate means and said steering plate to rotate said first section of a vehicle relative to said second section of a vehicle about said articulation joint.

8. A steering mechanism as set forth in claim 7 wherein said means to move said steering plate relative to said second section is a pair of opposed hydraulic piston and cylinder arrangements each of said arrangements having a first end mounted on said second section and having a second end connected to said steering plate to reciprocate said steering plate relative to said second section.

9. A steering mechanism as set forth in claim 7 wherein said first section of said vehicle has an annular member fixed thereto and said arcuate means is a portion of the outer face of said annular member, the center of curvature of said outer face of said annular member corresponds with the axis of articulation of said vehicle sections.

10. A steering mechanism as set forth in claim 7 wherein said means connecting said steering plate and said arcuate means are first and second spaced elongated flexible members entrained around said arcuate means of said first section, one end of said first elongated flexible member being fixed to one side of said arcuate means and the other end of said first elongated flexible member fixed to said steering plate and one end of said second elongated flexible member being fixed to the opposite side of said arcuate means and the other end of said second elongated flexible member being fixed to said steering plate.

11. A steering mechanism as set forth in claim 10 wherein a portion of each of said first and second flexible members is in engagement with a portion of the surface of said steering plate.

12. A steering mechanism as set forth in claim 11 wherein said first and second flexible members are chains.

13. A steering mechanism for an articulated vehicle having a first section and a second section interconnected by an articulation joint, said steering mechanism including an annular member fixed to said first section and an arcuate portion of the outer face of said annular member having a center of curvature corresponding with the axis of articulation of said sections of a vehicle, a steering plate slideably mounted on said second section to reciprocate in a horizontal plane which is perpendicular to the longitudinal axis of said vehicle, means connecting said arcuate portion of said annular member and said steering plate, and means to reciprocate said steering plate relative to said second section to adjust said means connecting said arcuate portion of said annular member and said steering plate to rotate said first section of a vehicle relative to said second section of a vehicle about said articulation joint.

14. A steering mechanism as set forth in claim 13 wherein said means to reciprocate said steering plate relative to said second section is opposed hydraulic piston and cylinder arrangements mounted on said second section and having ends connected to said steering plate to reciprocate said steering plate relative to said second section.

15. A steering mechanism as set forth in claim 13 wherein said means connecting said arcuate portion of said annular member and said steering plate are first and second spaced chains entrained around said arcuate portion of said annular member on said first section, one end of said first chain being fixed to one side of said annular member and the other end of said first chain being fixed to said steering plate, and one end of said second chain being fixed to the opposite side of said annular member and the other end of said second chain being fixed to said steering plate, said chains intersecting one above the other in a central region of said steering plate.

16. A steering mechanism as set forth in claim 15 wherein a portion of each of said chains is in engagement with a part of said arcuate portion of said annular member and a portion is in engagement with a part of said steering plate.

* * * * *

UNITED STATES PATENT AND TRADEMARK OFFICE
CERTIFICATE OF CORRECTION

PATENT NO. : 5,253,727
DATED : October 19, 1993
INVENTOR(S) : Michael Etherington and Michael R. Long It is certified that error appears in the above-indentified patent and that said Letters Patent is hereby corrected as shown below:

Title page, under References Cited, U.S. PATENT DOCUMENTS,
  "2,593,643 5/1952 Woolf ... 200/153" should read
  --2,593,643 4/1952 Woolf ... 200/153--
and
  "3 326,316 6/1972 Thassy ... 180/137" should read
  --3,326,316 6/1967 Thassy ... 180/137--.

Signed and Sealed this

Twenty-ninth Day of March, 1994

Attest:

BRUCE LEHMAN

*Attesting Officer*   *Commissioner of Patents and Trademarks*